May 28, 1929.  J. M. LEDBETTER  1,714,915
AGRICULTURAL MACHINE
Filed Oct. 15, 1927   5 Sheets-Sheet 2

May 28, 1929.　　　J. M. LEDBETTER　　　1,714,915
AGRICULTURAL MACHINE

Filed Oct. 15, 1927　　　5 Sheets-Sheet 4

Inventor
J. M. Ledbetter
By Lacey & Lacey, Attorneys

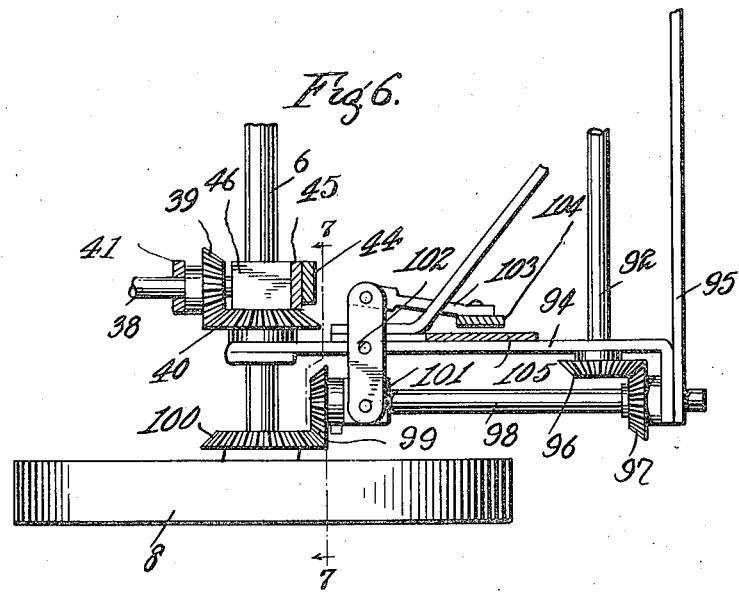
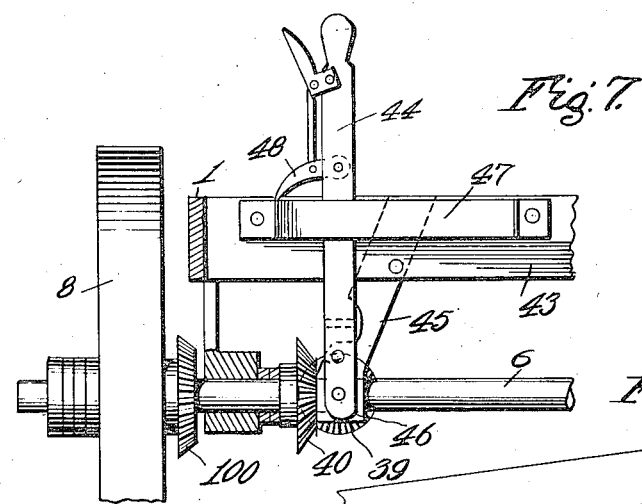
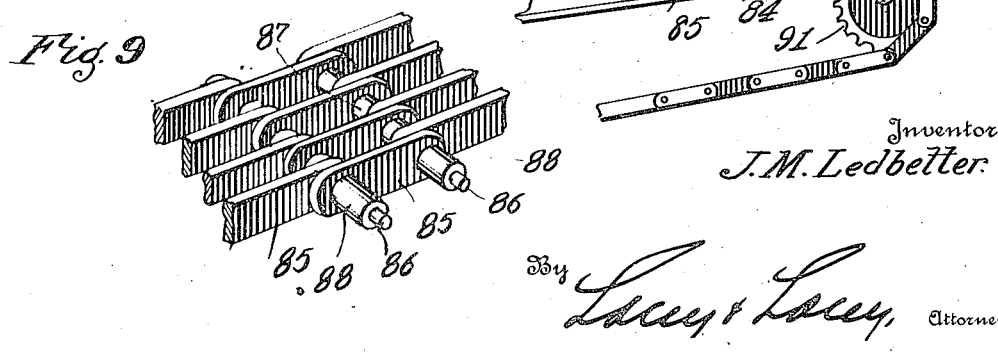

Patented May 28, 1929.

1,714,915

UNITED STATES PATENT OFFICE.

JOHN M. LEDBETTER, OF SAN SABA, TEXAS.

AGRICULTURAL MACHINE.

Application filed October 15, 1927. Serial No. 226,367.

This invention relates to agricultural machinery and has for its object the provision of a machine which will operate efficiently and may be employed for removing quack grass and other obnoxious growth and also for harvesting potatoes or other root crops. The invention provides a machine which, in operation, will turn over the soil and deliver the same onto a conveyer and, during the travel with the conveyer, will pulverize the clods and lumps which may be taken up with the loose soil. The invention also provides means whereby the loose soil may be separated from the crop and delivered onto the ground while the crop will be discharged into a receptacle at the rear end of the machine from which it may be removed as convenient. The working parts of the machine are all driven from the rear wheels, and means are provided for adjusting the several working parts and also throwing some of the same out of operation as may be desired. The invention is illustrated in the accompanying drawings and consists in certain novel features which will be hereinafter first fully described and then more particularly defined in the appended claims.

In the drawings:

Fig. 6 is a detail section on the line 6—6 of Fig. 1;

Fig. 7 is a detail section on the line 7—7 of Fig. 6;

Fig. 8 is a detail view showing a portion of the mounting for the screen conveyer, and Fig. 9 is a detail perspective view of a portion of the screen conveyer.

Figure 1:
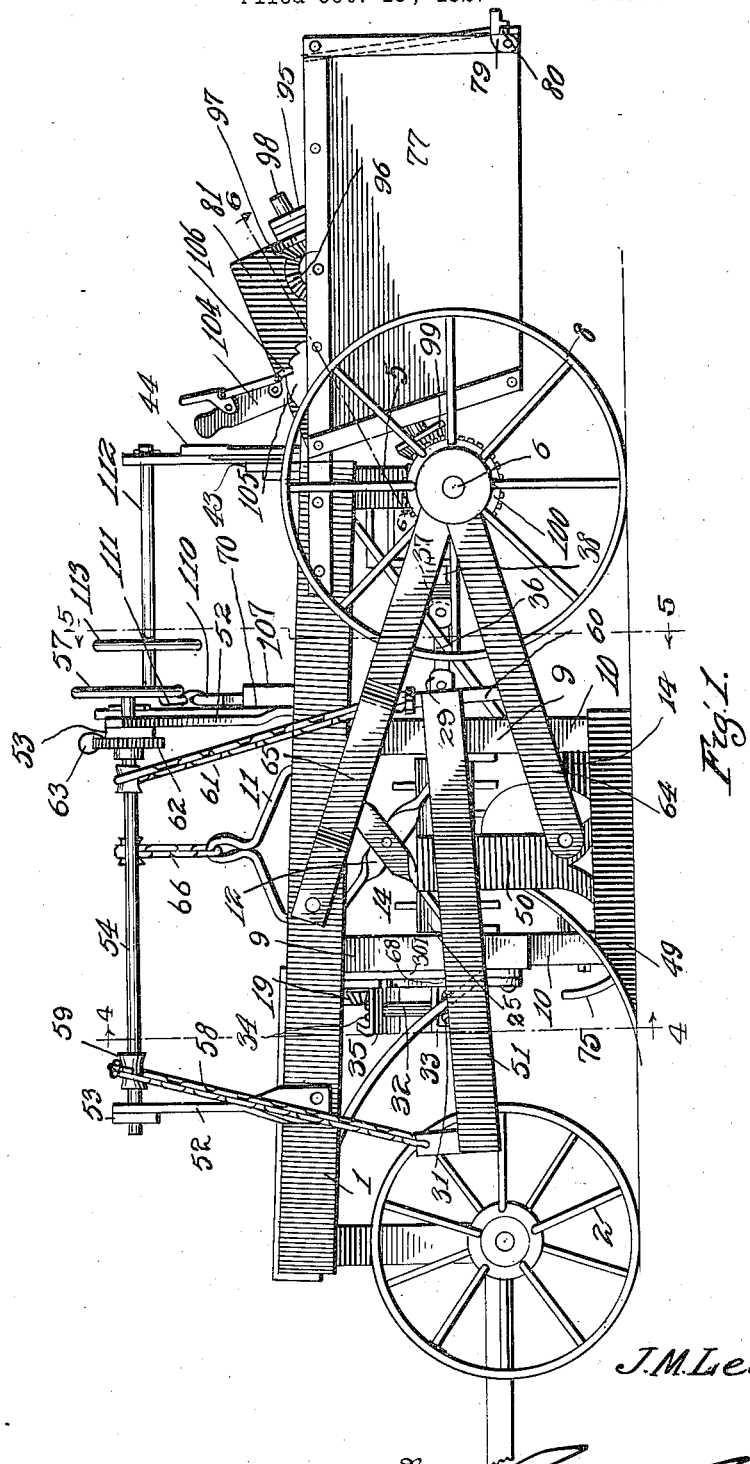
Figure 1 is an elevation of the left side of the machine.

The main frame 1 of the machine consists of longitudinal and transverse bars which may be constructed of angle or channel bars and are rigidly bolted together. The front end of the machine is supported by a truck 2 pivotally connected to the main frame by a bolt 3 and equipped with a draft pole or tongue 4. These several parts may be of any approved form and serve not only to support the front end of the machine but also facilitate the attachment of a draft team to the machine or the coupling of the machine to a tractor for steering and propelling. Near the rear end of the main frame, bearing brackets 5 are provided and in the said brackets is mounted an axle 6, a ground wheel 7 being keyed to the right end of the axle and a second ground wheel 8 being loosely mounted upon the left end of the axle.

Near the front end of the frame at the left side of the same, guiding columns 9 are secured to and depend therefrom, and in these guides are slidably fitted posts 10 connected at their upper ends by an arched hanger 11, suitable braces 12 being secured to and extending between the posts between their ends so as to maintain them in their proper spaced relation. Mounted in any preferred manner between the lower ends of the posts 10 is a drum or roller 13 about which is trained an endless apron conveyer 14 which is disposed between side plates 15 connected at their lower ends with the lower ends of the said posts by brackets or extension arms 16, the said plates being pivotally supported intermediate their ends by hangers 17 secured rigidly to and depending from cross bars of the main frame. Carried by the upper ends of the side plates 15 is an upper shaft 18 carrying a drum about which the upper bight of the apron 14 is trained and provided at its front end with a beveled gear 19 whereby rotation may be imparted to the said shaft. The shaft 18 is not mounted directly in the plates 15 but is carried by sliding bearings 20 mounted upon the side plates and constructed with longitudinal slots 21 engaging headed studs 22 on the side plates whereby the tension of the conveyer belt may be adjusted. To adjust the conveyer belt, a screw or bolt 23 is mounted in a lug 24 on each side plate and bears against the end of the bearing 20 so that the latter may be readily adjusted longitudinally of the side plate to maintain the proper tension upon the belt. Arranged above the lower bight of the conveyer belt 14 is a drum or roller 25 equipped with a plurality of radial teeth 26 whereby as the drum is rotated the teeth will forcibly engage the clods delivered onto the conveyer and break up and pulverize the same. The drum or roller 25 is secured upon a shaft 27 which extends across the conveyer and is equipped at its front end with a beveled gear 28 and at its rear end with one member of a universal coupling 29. The shaft is carried by bearing brackets 30 adjustably secured upon the side plates 15 and the gear 28 meshes with a beveled gear 31 on the left end of a transverse shaft 32 supported in a bearing bracket 33 which also extends around the front end of the shaft 27. The right end of the shaft 32 is equipped with a beveled gear 34 meshing with the gear 19 on the front end of the shaft 18 carrying the upper drum or roller, this end of the shaft 32 being carried by a bracket 35 corresponding to the bracket 33 and connected therewith by a bar 300. It will thus be seen that if motion be imparted to the shaft 27 the pulverizing drum will be rotated and the conveyer 14 will also be actuated, the several teeth 26 impinging upon the large lumps which may have been delivered onto the conveyer so that the lumps will be broken up and all of the earth which is taken up will be discharged from the conveyer in a pulverized condition. To rotate the shaft 27, a coupling bar or link 36 is connected to the shaft 27 by the universal coupling 29 and at its rear end is connected by a universal coupling 37 with a shaft 38 equipped at its rear end with a beveled gear 39 meshing with a beveled gear 40 secured to the rear axle 6 so that the parts thus far described will be actuated by the axle 6 which derives motion from the right ground wheel 7. The rear end of the shaft 38 is journaled in a yoke 41 pivoted at its front side in a hanger bracket 42, secured to the transverse frame bar 43, and secured at its rear end to a hand lever 44 which is fulcrumed above its lower end upon a bracket 45 depending from the frame bar 43 and terminating adjacent the axle 6, the lower end of the lever being pivoted to a box 46 which is slidably mounted on the axle 6 and has some rocking play thereon, this box carrying the rear extremity of the shaft 38. By rocking the lever 44, the rear end of the shaft 38 will be moved toward or from the gear 40 and the pinion 39 thereby shifted into or out of gear so that the operation of the front conveyor and the pulverizer may be arrested at the will of the operator whenever it may be necessary or desirable. The lever 44 plays in a guide loop 47 secured to the rear side of the cross bar 43 and is equipped with a latch 48 adapted to engage a notch provided therefor in the upper edge of the frame bar 43 whereby the gears will be held in mesh when the operation of the conveyer and the pulverizer is desired.

The soil is taken up and delivered onto the conveyer 14 by a turning and breaking plow 49 which is disposed at the left side of the machine immediately adjacent the lower bight of the conveyer and having its moldboard so arranged that it will partly overhang the lower bight of the conveyer whereby the soil and crop which may be dug up by the plow will be directed onto the conveyer to be carried away by the latter. The plow is secured to the lower end of a standard 50 which rises from the landside of the plow and passes between and is secured to the members of a two-part beam 51 which is supported at the side of the machine in advance of the left ground wheel 8, as shown clearly in Figs. 1 and 2. Erected on the main frame is an upper frame which may be of any suitable form and is indicated generally by the reference numeral 52, the said frame including parallel transverse bars 53 which extend the full width of the machine or substantially the full width thereof. In the cross bars 53 are mounted a plurality of longitudinally extending shafts 54, 55 and 56, each of which is equipped with a hand wheel, such as indicated at 57, and the shaft 54 is arranged directly over the plow beam 51. Attached to the plow beam 51 at or near the front end thereof is a chain or cable 58 which extends upwardly therefrom and passes over a guide pulley 59 secured upon the shaft 54 to be attached to the shaft 55 and wound thereon by proper manipulation of the hand wheel secured upon the said shaft. At the rear end of the plow beam is secured a vertically disposed rod 60, and to the upper end of this rod is attached a chain or cable 61 which passes upwardly therefrom and is attached to the shaft 54 to be wound thereon by proper manipulation of the corresponding hand wheel 57, and it is to be noted that each of the shafts 54, 55 and 56 is equipped with a ratchet wheel or disk, indicated at 62, and adapted to be engaged by a pawl or holding dog 63 secured upon the cross bar 53. These ratchets and dogs will permit the several shafts to be rotated in the proper direction to wind the cable or chain attached thereto but will prevent reverse rotation unless the pawls be released from the ratchets. By rotating both shafts 54 and 55, the plow may be adjusted as an entirety vertically so that it may be lifted clear of the ground or may be set to run at any desired depth and by rotating these shafts independently the plow may be tilted to any desired angle so that it will penetrate the ground and act upon the crops or the grass at the proper angle to thoroughly take up all the elements which it is desired to remove. The plow is caused to travel with the main frame by a push bar 64 pivoted at its front end to the standard 50 and having its rear end fitted about the left end of the axle 6 so that when the machine is drawn over the field the plow will be forced to travel forwardly, and, in order that the axle 6 may withstand the thrust thus imposed upon it, a brace 65 is attached to the main frame above the plow and has its rear end fitted to the axle, as will be understood. A chain or cable 66 is attached to the arched hanger 11 and passes over a guide roller 67 secured upon the shaft 55 and has its end attached to the innermost shaft 56 whereby to be wound thereon when the corresponding hand wheel 57 is manipulated. The receiving end of the conveyer 14 may thus be adjusted vertically to suit any given conditions, the side plates 15 and the conveyer unit rocking upon the pivotal connection of the side plates with the hangers 17. In order that the plow may be maintained in the proper relation to the main frame of the machine, a transverse supporting bar 68 is pivoted at its inner end to the bar 300 and the hanger 301 supporting said bar from the upper frame, and the outer end of this supporting bar 68 has a loose connection, indicated at 69, with the plow beam 51. At the rear side of the conveyer 14, a hand lever 70 is pivotally mounted on hangers depending from the main frame, and above and below the pivot of this lever links 71 and 72 are pivotally attached thereto. The outer end of the upper link 71 is engaged around the upper end of the rod 60, while the outer end of the lower link 72 is engaged around the lower end of said rod, detachment of the links from the rod being prevented by cotter pins or any other suitable means. The lever 70 is equipped with a latch 73 engageable in any one of a plurality of sockets provided therefor upon the adjacent cross bar of the machine so that the lever may be locked in any set position. It will be readily understood that the supporting bar 68 and the links 71 and 72 will maintain the plow in spaced relation to the side of the main frame in all its positions of vertical adjustment and by properly rocking the hand lever 70 the plow may be inclined transversely so that it will be given the proper tilt to efficiently direct the upturned soil and crops onto the conveyer 14.

In order that the lower ends of the posts 10 and the lower bight of the conveyer 14 may be prevented from contact with protruding portions of the soil, a runner 74 is carried by the lower ends of the posts and has its front extremity turned up in front of the front post, as shown at 75.

Figure 2:
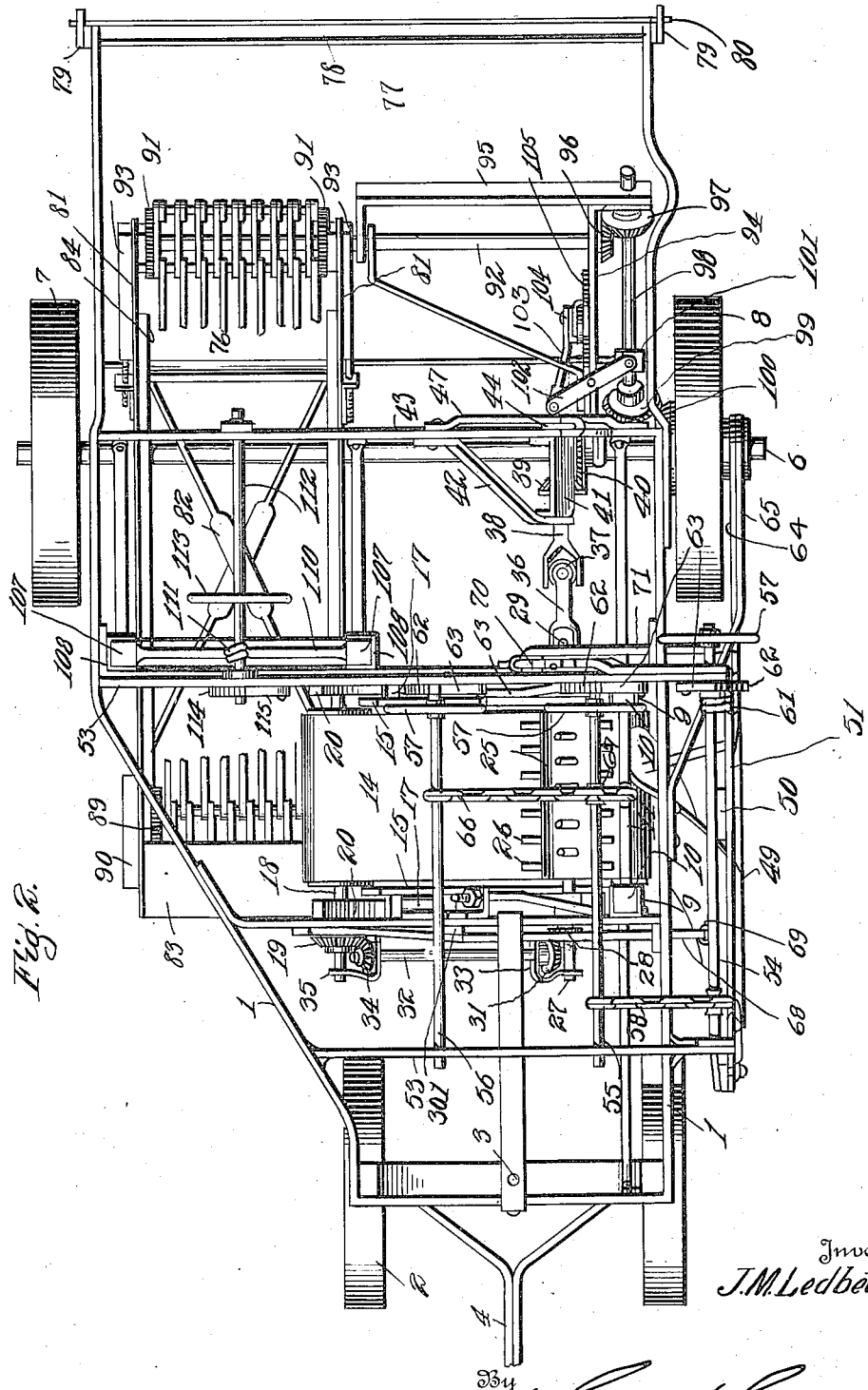
Fig. 2 is a plan view of the machine.
Figure 3:
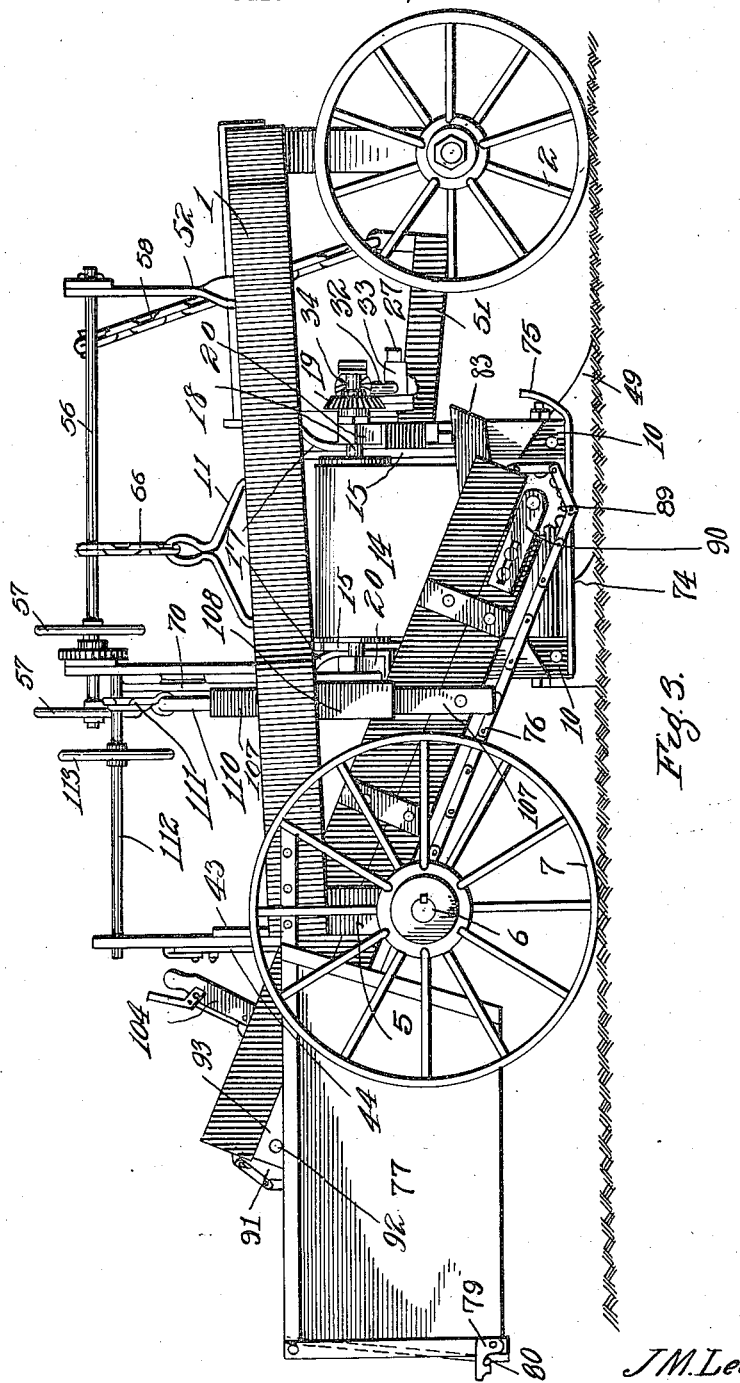
Fig. 3 is an elevation of the right side of the machine.
Figure 4:
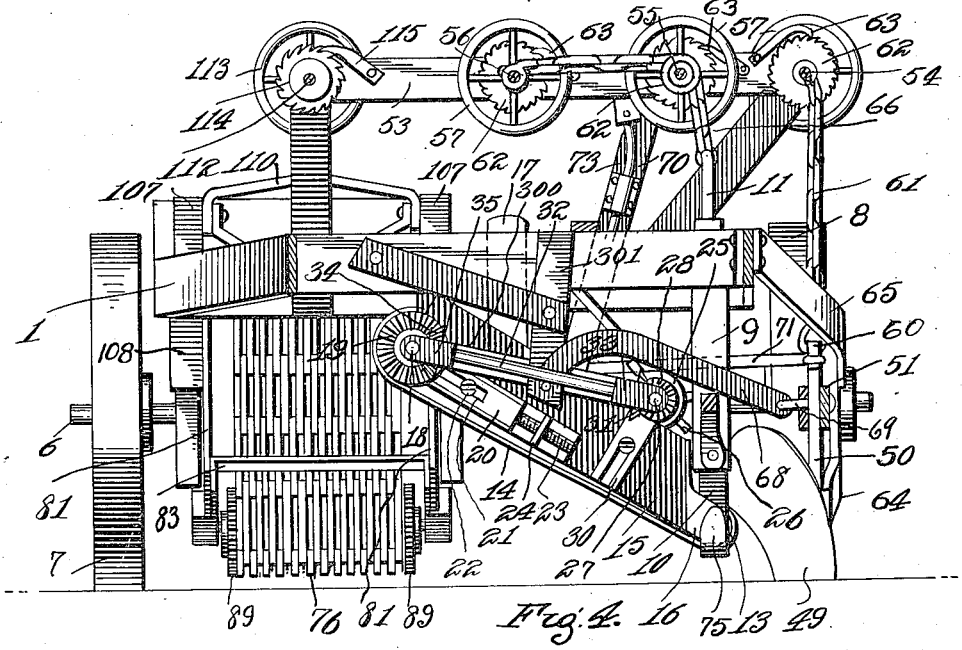
Fig. 4 is a transverse section on the line 4—4 of Fig. 1.

As shown best in Fig. 2, the transverse conveyer 14 extends just beyond the longitudinal center of the machine and is arranged to deliver the material deposited thereon onto a longitudinal conveyer 76 which carries the material rearwardly and delivers it into a receptacle 77 carried by the main frame at the rear end thereof. This receptacle may be of any approved form and is provided at its rear end with a door 78 pivoted adjacent its upper edge between the sides of the receptacle and held in closed position by latches 79 at the lower rear corners of the receptacle engaging over studs 80 on the lower corners of the door. The weight of the door will tend to hold it in closed position and the latches 79 positively prevent any accidental or premature opening swinging movement. When it is desired to remove the accumulations in the receptacle, the latches may be easily swung upwardly and forwardly to release the door, whereupon the crop may be withdrawn.

The longitudinal conveyer 76 is mounted between side plates 81 which are supported in an upwardly and rearwardly inclined position by resting upon the axle 6 and extending both forwardly and rearwardly therefrom. These side plates are connected between their ends by suitable braces 82 and at their front ends they are connected by a deflector or guide plate 83 which is suitably inclined and disposed adjacent the forward side of the transverse conveyer 14 so that the material discharged by the latter conveyer will be positively directed onto the longitudinal conveyer 76. The side plates 81 carry tracks 84 on their inner sides, and these tracks furnish a support for the chain which constitutes the body of the conveyer. The conveyer, as shown most clearly in Fig. 9, consists of links 85 pivoted upon transverse rods 86 and maintained in their proper spaced relation by spreaders or spacing sleeves 87 fitted upon the rods 86 between adjacent links so that openings will be maintained throughout the length of the conveyer through which the fine dirt may sift to be deposited upon the ground. At the ends of the rods 86 are mounted rollers 88 which run upon the tracks 84 and thereby support the chains or links and prevent them sagging under the weight imposed thereon. The chains are trained at the front bight of the conveyer about sprockets 89 carried by a drum or roller having trunnions at its ends mounted in the side plates 81 and carried by adjustable blocks 90 mounted upon the outer sides of the plates 81 so as to be adjusted longitudinally thereof and thereby set the front bight of the conveyer in the proper position. The upper bight of the conveyer is likewise engaged with sprockets 91 and these sprockets are secured eccentrically to a shaft 92 which is disposed transversely of the main frame and is driven from the left ground wheel 8. Inasmuch as the sprockets 91 are secured eccentrically upon this transmission shaft 92, the chain conveyer will be given a shaking or jerking motion as it travels longitudinally so that the soil deposited upon the conveyer will be agitated and caused to sift through the spaces between the several links of the conveyer. The roots and grass or other growths will be retained upon the conveyer, however, and will be carried rearwardly by it and delivered into the receptacle 77, as will be understood, the soil dropping to the ground and forming a fine mulch. The shaft 92 is mounted in boxes 93 which are supported upon the side plates 81 of the conveyer and adjustable longitudinally thereof to regulate the tension upon the conveyer while the left hand extremity of the shaft is carried in a bar 94 having its front end fitted loosely about the axle 6 and its rear end secured to a bracing frame 95. Upon the left hand extremity of the shaft 92 is a beveled gear 96 meshing with a similar gear 97 at the rear end of a longitudinal shaft 98 which is provided at its front end with a beveled gear 99 meshing with a main driving gear 100 secured to or formed upon the hub of the left hand ground wheel 8. The rear end of the shaft 98 has a limited lateral rocking movement in the bracket 94 and the frame 95 and its front end is journaled in a box 101 which is pivotally mounted between the outer ends of a pair of links 102. These links pass, respectively, above and below the bracket bar 94 and are pivoted between their ends upon the same, the inner ends of the links being connected by a rearwardly extending link 103 with the lower end of a hand lever 104 which is fulcrumed upon the bracket bar 94 or a plate 105 rising therefrom and is equipped with a latch 106 adapted to engage notches in the upper edge of said plate whereby the parts may be held in a set position. It will be understood that if the lever be rocked forwardly the shaft 98 will be swung about its support in the frame 95 to cause the gears 99 and 100 to mesh and if the lever be swung rearwardly the shaft will be rocked inwardly to withdraw the gear 99 from the driving gear 100, the box 101 sliding along the shaft to effect the desired rocking movement of the same, and the pivotal connection of the box with the links 102 permitting it to accommodate itself to the different angular positions of the shaft.

Figure 5:
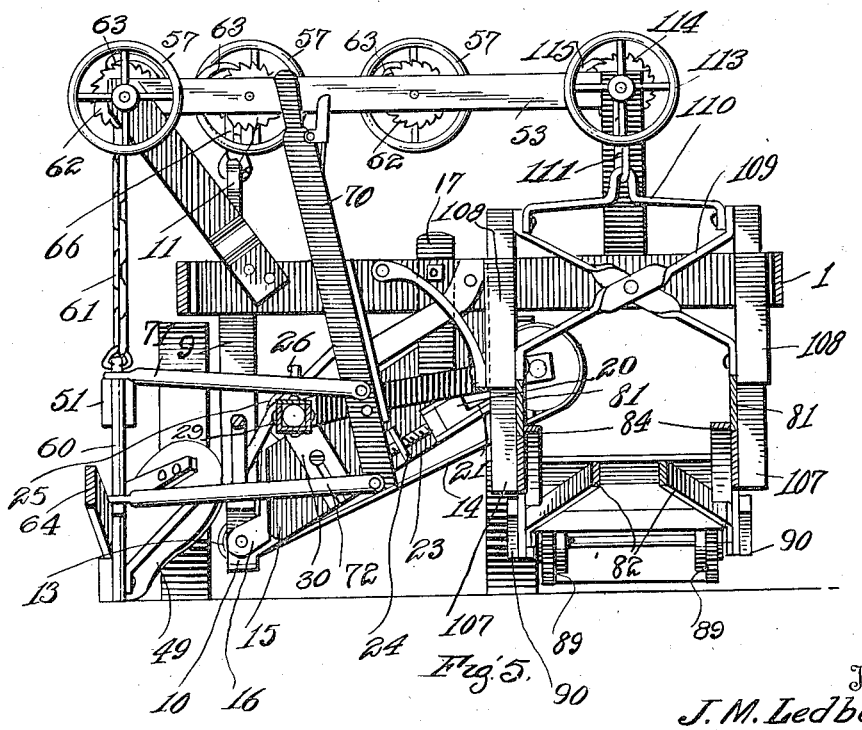
Fig. 5 is a transverse section on the line 5—5 of Fig. 1.

To adjust the screen conveyer to a desired degree of inclination, posts or hangers 107 are slidably mounted in vertical guides 108 secured to a cross bar of the main frame at the rear of the transverse conveyer, and these slidably mounted posts are held rigidly in the proper spaced relation by braces 109, as shown in Fig. 5. To the upper extremities of the posts 107 is connected an arched hanger 110 to which is attached a chain or cable 111 which extends upwardly and is secured to a winding shaft 112 disposed longitudinally of the main frame and equipped with a hand wheel 113 whereby it may be manipulated, a ratchet disk 114 and a coacting dog 115 being provided at the front end of the shaft so as to permit it to be rotated in the direction to wind the cable or chain and normally prevent unwinding.

From the foregoing description, taken in connection with the accompanying drawings, it will be seen that I have provided a very compact machine which as it is drawn over the field will take up the soil to any desired depth and turn the same, with any grass or any root crops which may be growing therein, to and deliver it onto the transverse conveyer. As the material is carried across the machine by this conveyer, it will be acted upon by the pulverizer so that all clods will be broken up and the crops thoroughly separated therefrom. The transverse conveyer delivers the soil and the other material onto the screen conveyer which at once acts thereon to carry it rearwardly and, as has been stated, the earthy matter will be sifted through the screen conveyer and deposited upon the ground in a fine mulch while the grass or the crops will be deposited in the receptacle. When the receptacle is filled, the load may be deposited upon the ground to be subsequently gathered or if it is grass and weeds may be permitted to remain until it is convenient to burn or otherwise destroy it. It will be noted that both conveyers are driven from power applied at their higher ends and buckling of the conveyers is thereby avoided. It will also be noted that the conveyers are independently driven so that either conveyer may be thrown out of operation while the other is permitted to work and if it becomes necessary to repair or renew any of the parts of one conveyer it is not necessary to entirely suspend the operation of the other conveyer. The conveyers are independently adjustable so that the proper inclination of either or both conveyers may be accurately and easily attained and the plow may be set to work at any desired angle and to penetrate to any desired depth.

In actual practice, the plow beam will frequently be equipped with a gage wheel and a rolling colter but these elements are well-known and, therefore, have not been illustrated in the drawings.

Having thus described the invention, I claim:

1. An agricultural machine comprising a wheel-supported frame, a turning plow carried by the frame at one side thereof, a conveyer mounted transversely on the frame with one end immediately adjacent the moldboard of the plow to receive material thereform, a rotary pulverizer mounted immediately over the receiving end of the conveyer to act on material passing from the plow, and means driven by one of the frame-supporting wheels whereby to actuate the conveyer and the pulverizer.

2. An agricultural machine comprising a wheel-supported frame, a turning plow mounted on the frame at one side thereof, a transverse conveyer mounted on the frame immediately adjacent the plow to receive material from the moldboard thereof, a longitudinally disposed screen conveyer mounted on the frame and receiving material from the transverse conveyer, means driven by one of the frame-supporting wheels to actuate the transverse conveyer, and means driven by another frame-supporting wheel to actuate the longitudinal conveyer.

3. An agricultural machine comprising a wheel-supported frame, a turning plow supported on the frame at one side thereof, a transverse conveyer mounted in the frame immediately adjacent the plow to receive material from the moldboard thereof and inclined upwardly from the plow, a longitudinal conveyer mounted on the frame at the side remote from the plow and having openings throughout its area, the front end of said longitudinal conveyer being disposed under the delivery end of the transverse conveyer, means driven by one of the frame-supporting wheels to actuate the transverse conveyer, and means driven by another frame-supporting wheel to actuate the longitudinal conveyer, the last-mentioned means including means at the rear end of the longitudinal conveyer for imparting a shaking motion to the longitudinal conveyer.

4. An agricultural machine comprising a wheel-supported frame, a turning plow supported on the frame at one side thereof, a transverse conveyer mounted on the frame adjacent the plow to receive material from the moldboard thereof, a longitudinal conveyer receiving material from the transverse conveyer, a pulverizer mounted over the receiving end of the transverse conveyer, and means for actuating the two conveyers and the pulverizer and including means for shaking the longitudinal conveyer whereby to separate the material passing over the same.

5. An agricultural machine comprising a wheel-supported frame, a plow disposed at the side of the frame, a transverse supporting bar pivotally mounted on the frame and connected at its outer end with the forward portion of the plow, means mounted on the frame and connected with the plow for suspending the same at a set height, and means mounted on the frame and connected with the rear end portion of the plow whereby to effect transverse tilting of the plow.

6. An agricultural machine comprising a supporting frame, a plow disposed at one side of the frame, a supporting bar pivotally mounted upon the frame and connected at its outer end with the front end portion of the plow, independently operable flexible suspending devices mounted on the frame and connected with the ends of the plow whereby to adjust the plow vertically and permit longitudinal tilting of the same, and elements mounted on the frame and connected with the rear end portion of the plow to rock the same transversely.

7. An agricultural machine comprising a supporting frame, a plow disposed at one side of the frame, means mounted on the frame and connected with the plow to maintain the plow at the side of the frame, a plurality of shafts mounted upon the frame above the plow, and flexible connections between the respective ends of the plow and the shafts whereby to permit independent vertical adjustment of the ends of the plow and effect longitudinal tilting thereof.

8. An agricultural machine comprising a supporting frame, a plow disposed at one side of the frame, a front supporting bar pivoted at its inner end upon the frame and having its outer end loosely connected with the front end portion of the plow, a lever mounted upon the frame, and links pivoted at their inner ends to the lever respectively above and below the fulcrum of the same and having their outer ends connected with the rear end of the plow in vertically spaced relation.

9. An agricultural machine comprising a supporting frame, a transverse conveyer mounted on the frame, a turning plow arranged at the side of the frame adjacent the conveyer to deliver material onto the same, a longitudinal conveyer mounted in the frame to receive material from the transverse conveyer, a deflecting plate at the front end of the longitudinal conveyer and under the upper end of the transverse conveyer, said plate being inclined downwardly and rearwardly, and means for actuating the conveyers.

10. In an agricultural machine, the combination of a supporting frame, a conveyer mounted thereon, and means for operating the conveyer comprising a driving beveled gear, a shaft having at one end a beveled gear meshing with the main driving gear and at its opposite end geared to a shaft supporting the upper bight of the conveyer, the lateral end of the shaft being mounted for rocking movement, a box supporting and slidable on the first-mentioned end of the shaft, and means for shifting said box longitudinally of the shaft in an arcuate path about a fixed center whereby to rock the shaft and shift the gear thereon into or out of mesh with the driving gear.

In testimony whereof I affix my signature.

JOHN M. LEDBETTER. [L. S.]